3,463,769
DIEPOXIDE FROM LEVOPIMARIC ACID
TRANSANNULAR PEROXIDE
Walter H. Schuller and Ray V. Lawrence, Lake City, Fla.,
assignors to the United States of America as represented
by the Secretary of Agriculture
No Drawing. Filed Apr. 2, 1964, Ser. No. 356,987
Int. Cl. C09f 1/04; C07d 1/10
U.S. Cl. 260—99                                    1 Claim A nonexclusive, irrevocable, royalty-free license in the invention herein described, throughout the world for all purposes of the United States Government, with the power to grant sublicenses for such purposes, is hereby granted to the Government of the United States of America.

This invention relates to the new and useful diepoxide (I) and to its esters and salts. More specifically, it relates to a process for preparing (I) by means of the thermal rearrangement of 6,14-peroxy-Δ⁷⁽⁸⁾-dihydroabietic acid (II), by heating (II) in an inert solvent. The diepoxide (I) have a variety of commercial uses including the preparation of casting resins, laminating resins, adhesives, and can be combined with HA-type reagents to give surface coatings, as will be discussed more fully below.

The structure of the diepoxide, sometimes referred to below as the free acid, is (I):

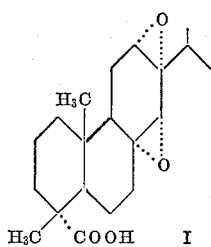

It exhibits $[\alpha]_D^{25}$—70.3° (c. 0.80 in 95% ethanol) and has a melting point of 172–174° C.

The structure of 6,14-peroxy-Δ⁷⁽⁸⁾-dihydroabietic acid, frequently referred to below as levopimaric acid transannular peroxide, is (II):

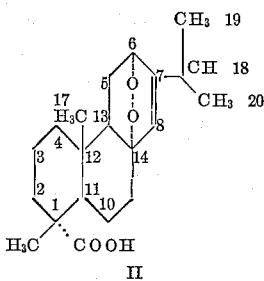

It exhibits $[\alpha]_D^{25}$+101° (.1% in ethanol), $M_D$+305. The numbering system is according to W. Klyne, J. Chem. Soc. 3072 (1953).

As used herein, the term levopimaric acid transannular peroxide (II) is meant to include not only the transannular peroxide of levopimaric acid, but the transannular peroxides of the alkyl esters of levopimaric acid, and also the transannular peroxides of photosensitized oxidized pine gum including their alkyl esters. The alkyl groups may contain from one to ten carbon atoms. The above products will be discussed more fully below.

The preparation of levopimaric acid transannular peroxide (II), the alkyl esters of (II), and the transannular peroxides of photosensitized oxidized pine gum may be prepared according to U.S. Patent No. 2,996,515, issued Aug. 15, 1961. The process involves a photosensitized oxidation whereby pine gum in a solution containing a small amount of a sensitizing dye, such as rose bengal, is simultaneously aerated and irradiated with visible light.

The process of the thermal rearrangement of levopimaric acid transannular peroxide (II) can be carried out in any suitably inert solvent, such as toluene, ortho-, meta-, or paraxylene, or mixed xylenes, cumene, pseudocumene, alkylated benzenes of all types, anisole, phenetole, etc. One of the more satisfactory solvents is mixed xylenes having a boiling point at about 138° C.

The temperatures at which the thermal rearrangement can be carried out can be varied from about 110° C. to about 265° C. using an oil bath with a preferable range of about 130–160° C. At 138° C. the reaction requires about 10 hours to go to approximate completion. If higher temperatures are used, shorter heating times are required and, conversely, if lower temperatures are employed longer reaction periods are necessary for complete conversions. It is an advantage of our process that the rate and completeness of the reaction are easily controlled by determining the optical rotation $[\alpha]_D$ of the solution.

The concentration of the levopimaric acid transannular peroxide in the inert solvent should generally not exceed 4% as side reactions or subsequent reactions then become undesirable in amount. A preferable concentration of the peroxide in mixed xylene for a reaction at about 138° C. is about 2–3%, 2.5%, causing excellent results to be obtained.

Upon completion of the thermal rearrangement of the diepoxide, as can be determined by its optical rotation, it can be converted to an amine salt, e.g., a tertiary butyl amine salt. This is done by the addition of about 20% excess of the stoichiometrical amount of a soluble lower alkyl amine having one to eight carbon atoms required to react with the diepoxide. The amine salt can then be separated from the solution.

The thermal rearrangement of the alkyl esters of levopimaric acid transannular peroxide gives products differing from those obtained by the thermal rearrangement of the free acid. One product obtained by the process using the methyl ester as the starting material has the following properties after one crystallization from aqueous ethanol: M.P. 135–143° C.; $[\alpha]_D^{25}$—157° (c. 1.0 in 95% ethanol); no characteristic absorption from 220–320μ; no peroxide content; $\lambda_{max}$ (Nujol mull) 8.06, 11.12, 11.45, 11.68μ, essentially no absorption from 220–320μ. Such a product forms an embodiment of our invention.

The product of photosensitized oxidized pine gum consists essentially of a mixture of transannular peroxides from levopimaric acid, palustric acid, and neoabietic acid [cf. J. Am. Chem. Soc., 80, 1438 (1958); ibid., 82, 1734 (1960); ibid., 83, 2563 (1961)]. On heating this photosensitized oxidized pine gum in an inert solvent, such as mixed xylenes, at about 138° C., all of the peroxide content is lost and a product consisting of a mixture of diepoxides, including the one from levopimaric acid transannular peroxide is obtained. This mixture of diepoxides is of considerable interest commercially due to its low cost of preparation, being prepared in only two steps from the low-cost, crude, pine gum raw material. The use of this mixture of the diepoxides as additives to asphalt in preparing nonskid surfaces for roads is a demonstrated outlet for a cheap source of such a mixture of diepoxides and is also an embodiment of our invention.

The following examples are set forth by way of illustration only and it will be understood that the invention is not to be construed as limited in spirit or in scope by the details therein. Temperatures are given in degrees centigrade. The following abbreviations are employed: M.P. means melting point; neut. equiv. is neutral equivalent; n.m.r. (or N.M.R.) is nuclear magnetic resonance expressed as $\tau$ (tau); 95% ethanol means 95% ethanol plus 5% water.

Melting point (M.P.) is determined by means of a Thomas Hoover melting point apparatus; $[\alpha]_D^{25}$ via standard equipment; Infrared $\lambda_{max}$ (Nujol mull) via Perkin-Elmer model 21 infrared spectrophotometer; and n.r.m. by means of a Varian A-60 spectrophotometer.

EXAMPLE 1

A solution of 2.5 gm. of levopimaric acid transannular peroxide in 125 ml. of mixed xylenes is refluxed at about 138° C. The reaction is followed by a change in the optical rotation of the solution. A plot of optical rotation vs. time, levels off in about 10 hours at $[\alpha]_D$ —49°; refluxing is continued for 4 more hours with little change in value of $[\alpha]_D$. The peroxide content is essentially zero in 12 hours. A crystalline tertiary butylamine salt of the product is obtained in 95% yield by weight.

The salt is recrystallized to constant optical rotation from acetonitrile; yield 2.14 g. (71%); M.P. 183–186° C. decomposes with evolution of gas; $[\alpha]_D^{25}$ —42.7° (c. 0.91 in 95% ethanol); no characteristic absorption from 220–320$\mu$; $\lambda_{max}$ (Nujol mull) 6.87 (m.), 11.88 (w.), 12.0$\mu$ (w.)

*Analysis.*—Calcd. for $C_{24}H_{41}ON$: C, 70.7; H, 10.1; N, 3.44; O, 15.7; Neut. Equiv. 408. Found: C, 70.5; H, 10.1; N, 3.65; O, 15.8; Neut. Equiv. 408.

The free acid is liberated from the above salt in 98% yield using dilute phosphoric acid in water. 1.5 g. of the salt is agitated in a solution of 0.48 ml. conc. phosphoric acid (50% excess) in 50 ml. of water and 50 ml. ether. An analytical sample was recrystallized to constant optical rotation from di-n-propyl ether and then from aqueous methanol; M.P. 172–174° C. decomposes with evolution of gas; $[\alpha]_D^{25}$ —70.3° (c. 0.80 in 95% ethanol); no characteristic absorption from 220–320 m$\mu$; $\lambda_{max}$ (Mujol mull) 6.92 (shoulder), 8.88 (w.), 11.1 (w.), 11.9 (w.), 12.0$\mu$ (w.).

*Analysis.*—Calcd. for $C_{20}H_{30}O_4$: C, 71.8; H, 9.0; O, 19.1; Neut. Equiv. 334.4. Found: C, 71.6; H, 9.2; O, 19.3; Neut. Equiv. 335.5.

EXAMPLE 2

A portion of the free acid of Example 1 is used for the preparation of the methyl ester by reaction with diazomethane to give a pure product of unchanged M.P. on recrystallization from aqueous methanol; M.P. 121° C.; $[\alpha]_D^{25}$ —72.4° (c. 0.60 in 95% ethanol); no absorption from 220–320 m$\mu$; $\lambda_{max}$ (Nujol mull) 7.0 (m.), 8.04 (s.), 8.82 (m.), 11.07 (m.), 11.85 (w.), 11.97$\mu$ (w.), no bands in 3$\mu$ region; n.m.r. $\tau$=6.99 (1 proton; hydrogen on carbon bearing an oxygen function), a doublet superimposed on a second doublet at about $\tau$=7.13, 7.23 (total area equivalent to 1 proton; a hydrogen on carbon bearing an oxygen function split by two nonequivalent adjacent hydrogens).

*Analysis.*—Calcd. for $C_{21}H_{32}O_4$: C, 72.4; H, 9.3; O, 18.4. Found: C, 72.3; H, 9.5; O, 18.2.

EXAMPLE 3

A solution of 5 g. of levopimaric acid transannular peroxide in 125 ml. of cumene is held at 138° C. and the reaction is followed by the change in optical rotation. After a low of $[\alpha]_D^{25}$ —43° at eleven hours, the rotation rises to —41° at twelve hours, whereupon the reaction is stopped and the tertiary-butylamine salt obtained in 90% yield. After recrystallization from acetonitrile the salt is obtained in 60% overall yield (3.66 g.); $[\alpha]_D^{25}$ —43° (c. 1.0 in 95% ethanol).

EXAMPLE 4

A solution of 3.5 g. of levopimaric acid transannular peroxide in 125 ml. of pseudocumene is held at 150° C. in an oil bath. The reaction is followed by means of the change in optical rotation. The rotation levels off at $[\alpha]_D$ —50° in about 9 hours, whereupon heating is stopped. The tertiary-butylamine salt is prepared in 95% yield and recrystallized from acetonitrile to give 2.77 g. (65%) of pure salt.

Other organic amines including cyclohexylamine, 2-amino-2-methyl-1-propanol, etc., can be substituted for the tertiary-butylamine.

EXAMPLE 5

A solution of 2.5 g. of levopimaric acid transannular peroxide in 125 ml. of mixed xylenes is refluxed at 138° C. for 12 hours. The rotation is $[\alpha]_D^{25}$ —49° at this point, and the reaction is stopped. The tertiary-butylamine salt is prepared in 95% yield by adding 0.93 ml. (20% excess) of tertiary-butylamine and diluting the solution to one liter with pentane. On chilling, 2.89 g. (95%) of the salt is obtained. After recrystallization from acetonitrile the salt weighs 1.83 g. (60%); $[\alpha]_D$ —43° (c. 1.0 in 95% ethanol).

EXAMPLE 6

A solution of 2.5 g. of the methyl ester of levopimaric acid transannular peroxide in 125 ml. of mixed xylenes is refluxed at 138° C. The reaction is followed by a change in optical rotation and a decrease in peroxide content. A plot of time vs. optical rotation levels off at 26 hours at $[\alpha]_D^{25}$ —126°. The peroxide concentration also levels off at this point at exactly 50% of the value observed at the start of the reaction. The solvent is stripped off under reduced pressure and the residue crystallized from aqueous-ethanol to give 0.34 g. of white crystals having the following characteristics: M.P. 135–143° C.; $[\alpha]_D^{25}$ —157° (c. 1.0 in 95% ethanol); no characteristic absorption from 220–320 m$\mu$, no peroxide content; $\lambda_{max}$ (Nujol mull) 8.06, 11.12, 11.45, 11.68$\mu$, essentially no absorption in 3$\mu$ region.

EXAMPLE 7

A solution of 5 g. of photosensitized oxidized pine gum (prepared according to U.S. Patent 2,996,515) containing 0.50 equivalent of peroxide/mole of resin acid in 125 ml. of mixed xylenes is refluxed at 138° C. for 12.5 hours at which time all of the peroxide content has essentially disappeared as determined by titration by means of the method of Schuller and Lawrence, J. Am. Chem. Soc. 83, 2563 (1961). The solvent is removed by stripping under reduced pressure and the residual syrup is dried in vacuo to give a friable solid which is soluble in ethanol, methanol, benzene, and acetone, but insoluble in water and isooctane. Because of its low cost, it is especially useful for addition to asphalts to provide nonskid surfaces on sidewalks and highways.

EXAMPLE 8

A portion of the product of Example 7 is treated by the addition of 5% of boron-trifluoride etherate (a commercially available product), heating for 10 minutes at 100° C., and then for six hours at 160° C. A hard, glossy resin is obtained useful in surface coatings.

We claim:

1. The product prepared by the process of thermally rearranging the mixed transannular peroxides resulting from the photosensitized oxidation of pine gum to give the corresponding diepoxides which process comprises the following operations performed in sequence:
- (a) heating the photosensitized oxidized pine gum in an inert organic solvent with stirring to a temperature of about 110°–265° C.
- (b) continuing the heating at said temperature until the peroxide content is reduced to essentially zero,
- (c) removing the solvent by stripping under reduced pressure, and
- (d) recovering the thermally rearranged products by drying in vacuo.

References Cited

UNITED STATES PATENTS

| | | |
|---|---|---|
| 2,950,289 | 8/1960 | Weisenborn. |
| 3,090,792 | 5/1963 | Tyner. |
| 2,890,209 | 6/1959 | Phillips et al. _____ 260—78.3 |
| 3,112,294 | 11/1963 | Newey _____ 260—78.3 |
| 2,996,515 | 8/1961 | Moore et al. _____ 260—340.3 |

OTHER REFERENCES

Matic et al.: J. Chem. Soc. (London), 1953, pp. 349–350.

Agnello et al.: Jour. Am. Chem. Soc., vol. 78 (1956), pp. 4756–4760.

Hawkins: Organic Peroxides (1961), pp. 243–244, 248.

Schuller et al.: Ind. Eng. Chem., Prod. Res. Develop., vol. 3, No. 2, June 1964, pp. 97–100.

NORMA S. MILESTONE, Primary Examiner

U.S. Cl. X.R.

260—2, 348